United States Patent Office 3,197,477
Patented July 27, 1965

3,197,477
ALLYLHYDANTOINS
Franklyn W. Gubitz, Nassau, N.Y., assignor to Sterling Drug Inc., New York, N.Y., a corporation of Delaware
No Drawing. Original application May 1, 1961, Ser. No. 106,483. Divided and this application June 6, 1962, Ser. No. 200,317
3 Claims. (Cl. 260—309.5)

This application is a division of my copending application Serial No. 106,483, filed May 1, 1961.

This invention relates to mercury derivatives of allylhydantoins and to 1-, 3- and 5-substituted derivatives thereof. More specifically the invention relates to compounds having the formula

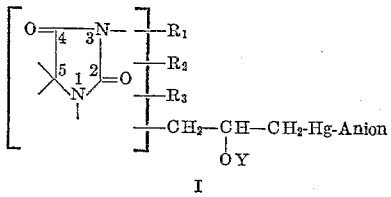

wherein one of the free valences of the hydantoin ring is satisfied by the grouping

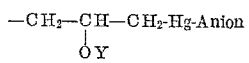

and the remaining free valences are satisfied by the groups $R_1$, $R_2$ and $R_3$, which can be the same or different and are H, lower-alkyl, monocyclic-aryl-lower-alkyl, or monocyclic-aryl.

For the purpose of this invention the term lower-alkyl is defined as a straight- or branched-chain aliphatic radical containing from one to four carbon atoms, for example, methyl, ethyl, propyl, isopropyl, isobutyl and n-butyl.

Monocyclic-aryl is defined as an aromatic carbocyclic or heterocyclic radical containing no more than six atoms in the aromatic ring and carrying from zero to three substituents, for example, lower-alkyl, halogeno, nitro, carbalkoxy, alkoxy, alkylmercapto, trifluoromethyl, lower-alkylsulfonyl, and the like. Examples of monocyclic-aryl groups so defined are phenyl, pyridyl, thienyl, furyl, o-tolyl, p-anisyl, 2,4-dinitrophenyl, p-chlorophenyl, 5-methyl-2-pyridyl, and the like.

Monocyclic-aralkyl is defined as monocyclic-aryl as defined above chemically bonded through an alkylene group containing from one to four carbon atoms.

The term Y in Formula I above is H or the organic portion of a hydroxylic solvent, YOH, containing from one to six carbon atoms; examples of such solvents are methanol, ethanol, 1-propanol, 2-propanol, 1-butanol, 2-methoxyethanol, ethylene glycol, 2-ethoxyethanol, glycerol, ethylenechlorohydrin, ethylenebromohydrin, and the like. Thus the term Y is respectively methyl, ethyl, propyl, isopropyl, butyl, methoxyethyl, hydroxyethyl, ethoxyethyl, 2,3-dihdroxypropyl, 2-chloroethyl, 2-bromoethyl, and the like.

The anion shown in Formula I is an ion derived from an organic or inorganic acid, HAnion, by the removal of an acidic hydrogen ion; examples of such anions are halide, hydroxy, alkanoate, nitrate, alkylsulfonate, arylsulfonate, alkylmercapto, arylmercapto, aryloxy, theophyllinyl, succinimido, and the like.

A preferred class of the groups $R_1$, $R_2$ and $R_3$ comprises hydrogen, lower-alkyl, benzyl, and phenyl substituted by from 0 to 3 halogeno, lower-alkyl or alkoxy groups. Consequently examples of the preferred class of the groups $R_1$, $R_2$ and $R_3$ include H, methyl, ethyl, propyl, phenyl, p-chlorophenyl, p-bromophenyl, p-fluorophenyl, 3,4 - dichlorophenyl, p-tolyl, p-methoxyphenyl, 2,4,6-trimethylphenyl, and the like.

Extensive pharmacological evaluation of the compounds of the invention has shown that they are valuable diuretics. Administered orally to dogs at non-toxic dose levels, the compounds produced outstanding diuretic and chloruretic effects; their utility is thus indicated in the treatment of edematous conditions.

The starting materials for the mercurated products of Formula I have the following general formulas:

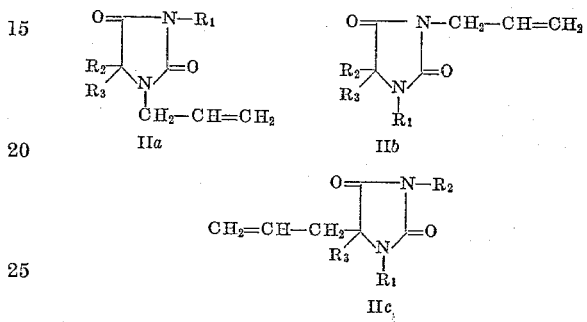

where $R_1$, $R_2$ and $R_3$ have the meanings given above.

The intermediate allylhydantoins can be conveniently prepared by the acid-catalyzed cyclization of the proper hydantoic acid; thus, 1-allylhydantoins of the Formula IIa above are prepared from 3-allylhydantoic acids as in Formula IIIa:

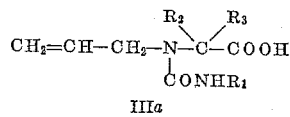

Similarly, 3-allylhydantoins of Formula IIb above can be prepared from 5-allylhydantoic acids (Formula IIIb),

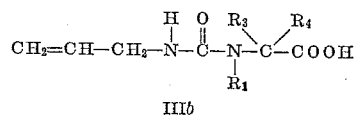

and the 2-allylhydantoic acids of Formula IIIc yield 5-allylhydantoins on cyclization.

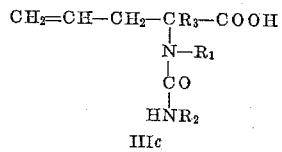

The process for carrying out the cyclization involves heating the allylhydantoic acid in dilute or concentrated mineral acid at temperatures ranging from about 50° C. to about 150° C.

The 3-allylhydantoins of Formula IIb can also be prepared in good yield by alkylating the appropriate hydantoin, unsubstituted in the 3-position, with an allyl halide in the presence of an acid acceptor.

1- and 5-allylhydantoins which are unsubstituted in the 3-position can be alkylated in that position with for example an alkyl halide or sulfate in the presence of an acid acceptor.

The alkylation or allylation of the hydantoin ring is carried out by heating the hydantoin with the alkylating or allylating agent in a suitable solvent, for example a lower-alkanol or a lower-alkyl ketone. Although the reaction will proceed slowly at room temperature, it is convenient to carry out the reaction at the boiling point of the solvent selected. The acid acceptor, which is also present in the reaction medium, is a basic substance, for example, alkali-metal hydroxides or alkoxides, alkali-metal carbonates, tertiary-amines, alkali-metal amides and the like, the purpose of which is to take up the hydrogen halide or hydrogen sulfate which is formed during the course of the reaction. The acid acceptor preferably forms a by-product which is easily separable from the rest of the reaction mixture.

The mercurated products are conveniently prepared by reacting a mercuric salt, preferably mercuric acetate, with the appropriate allylhydantoins selected from the group shown in Formulas IIa, b and c. The reaction is carried out at temperatures ranging from about 15° C. to about 150° C. in a suitable hydroxylic solvent, for example, water, methanol, ethanol, n-propanol, isopropyl alcohol, n-butanol, ethylene glycol, mono-ethers of ethylene gylcol, and the like. The reaction takes place at room temperature, but it is convenient to warm the mixture initially to facilitate dissolving the mercuric salt and the allylhydantoin.

The products formed by the reaction correspond to the following formulas:

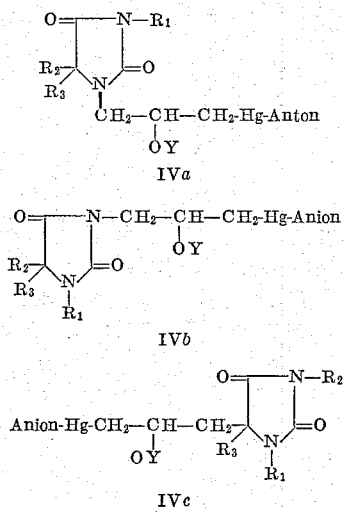

wherein Y is hydrogen or the organic portion of the particular hydroxylic solvent used, and $R_1$, $R_2$, $R_3$ and the anion are as described above.

When mercuric acetate is the mercurating agent, the anion of the product first formed is acetoxy. The product wherein the anion is hydroxyl can be prepared by treating the acetoxy compound with an aqueous solution of an alkali metal hydroxide. The compounds wherein the anion is hydroxyl can then be treated with any desired acid, HAnion, to produce the corresponding compound bearing the desired anion.

Alternatively, when solubility-product relationships are favorable, a mercurial bearing a desired anion may be obtained by a simple metathetical reaction of the acetoxy-mercuri compound with a salt of the desired anion. For example, 1-(3-acetoxymercuri-2-methoxypropyl)hydantoin, when treated with a solution of sodium chloride, gives 1-(3-chloromercuri-2-methoxypropyl)hydantoin and sodium acetate.

The following examples serve to illustrate the invention without intending to limit it thereto.

PREPARATION OF INTERMEDIATES

*3-allylhydantoic acid.*—N-Allylglycine (9.4 g., 0.08 mole) was dissolved in a solution containing 8.2 g. (0.1 mole) of potassium cyanate in 25 ml. of water. Upon acidification of the solution, 9.3 g. of crude product were precipitated. One recrystallization from isopropyl alcohol yielded 5.3 g. (41% of theoretical) of white prisms, M.P. 105–110° C. (dec.) (corr.).

*Analysis.* Calcd. for $C_6H_{10}N_2O_3$: N, 17.7; N. E., 158. Found: N, 17.8; N. E., 161

*1-allylhydantoin* [Formula IIa; $R_1=R_2=R_3=H$]. — Ethyl N-allylglycinate (48.3 g., 0.337 mole) and nitrourea (36.8 g., 0.34 mole) were dissolved in 300 ml. of ethanol and allowed to stand over-night at room temperature. The solution was then warmed and evaporated to dryness. To the residue which was ethyl 3-allylhydantoate was added 75 ml. of 25% hydrochloric acid, and the solution was heated on a steam bath for two hours. After removing the water and excess hydrochloric acid in vacuo, the dried yellow residue was recrystallized from n-butanol. The crude yield of product melting at 91–96° C. (uncorr.), was 41 g. Further recrystallization from n-butanol yielded 1-allylhydantion in the form of blade-shaped crystals, M.P. 94.6–98.4° C. (corr.).

*Analysis.* —Calcd. for $C_6H_8N_2O_2$: C, 51.42; H, 5.75; N, 20.00. Found: C, 51.45; H, 5.99; N, 19.75.

*1-allylhydantoin* can also be prepared by the following procedure: Suspend 26.5 g. (0.1675 mole) of 3-allylhydantoic acid (preparation given above) in 50 ml. of concentrated hydrochloric acid and heat at about 90° C. for 1.5 hours. Remove the water from the solution and recrystallize the dry residue from n-butanol. The product crystallizes in the form of clusters of colorless blades. The melting point is given above.

*3 - allyl-5,5-dimethylhydantoin* [Formula IIb; $R_1=H$; $R_2=R_3=CH_3$].—A solution of sodium methoxide in methanol was prepared by adding 4.6 g. (0.2 mole) of sodium portionwise to 500 ml. of absolute methanol. Commercial 5,5-dimethylhydantion (25.6 g., 0.2 mole) was added with stirring, and 25.4 g. (0.21 mole) of allyl bromide was then added rather rapidly. The mixture was refluxed for 5.6 hours, and the solvent was stripped off in vacuo. After extracting the product with ether and evaporating the solvent, the only residue was crystallized from ether-pentane. Repeated recrystallization from the same solvent couple yielded 8.1 g. of white blade-shaped crystals melting at 60.8–70.4° C. (corr.).

*Analysis.* —Calcd. for $C_8H_{12}N_2O_2$: C, 57.12; H, 7.19; N, 16.66. Found: C, 57.08; H, 7.41; N, 16.60.

*3 - allyl - 1 - methylhydantoin* [Formula IIb; $R_1=CH_3$; $R_2=R_3=H$].—Following the procedure outlined above for the preparation of 3-ally-5,5-dimethylhydantoin, there was obtained from 51 g. (0.5 mole) of 1-methylhydantoin 72.6 g. (0.6 mole) of allyl bromide, and 35 g. (0.65 mole) sodium methoxide in 500 ml. of absolute methanol a yield of 35.5 g. of 3-allyl-1-methylhydantoin as a colorless oil boiling in the range of 68–71° C. (0.08 mm.). An analytical sample of the compound prepared according to this procedure was redistilled; B.P. 73–76° C. at 0.13 mm. of Hg.

*Analysis.*—Calcd. for $C_7H_{10}N_2O_3$: C, 54.53; H, 6.54; N, 18.17. Found: C, 54.56; H, 6.66; N, 18.03.

*1-allyl-3-methylhydantoin* [Formula IIa; $R_1=CH_3$; $R_2=R_3=H$].—Calcined potassium carbonate (27.6 g., 0.2 mole) was ground to a powder and suspended in a solution containing 14.0 g. (0.1 mole) of 1-allylhydantoin (preparation given above) in 500 ml. of dry acetone. After the mixture had been refluxed for 1 hour, 28.4 g. (0.2 mole) of methyl iodide was added, and refluxing was continued for 12 hours. The mixture was filtered, and the filtrate was concentrated in vacuo to a yellow oil. The crude product was separated from the inorganic salts by extraction with ether. The residue left on evaporation of the ether was distilled at 77–78° C. at 0.1 mm. of Hg to give a yellow oil which on redistillation boiled at 71–73° C. at 0.08 mm. of Hg. The yield of 1-allyl-3-methylhydantoin as a colorless oil $n_D^{25}$ 1.4970, was 12.9 g.

*Analysis.*—Calcd. for $C_7H_{10}N_2O_2$: C, 54.53; H, 6.54; N, 18.17. Found: C, 54.74; H, 6.42; N, 18.11.

*5-allyl-3-methylhydantoin* [Formula IIc; $R_1=R_2=H$;

$R_3=CH_3$].—Following the procedure outlined above for the preparation of 1-allyl-3-methylhydantoin, there was obtained from 14.0 g. (0.1 mole) of 5-allylhydantoin, 28.4 g. (0.2 mole) of methyl iodide, 27.6 g. (0.2 mole) of calcined potassium carbonate and 250 ml. of acetone a yield, after recrystallization from ether, of 11.0 g. of 5-allyl-3-methylhydantoin as white needles, M.P. 90–92° C. (corr.)

*Analysis.*—Calcd. for $C_7H_{10}N_2O_2$: C, 54.53; H, 6.54; N, 18.17. Found: C, 54.23; H, 6.55; N, 18.11.

Following the procedures outlined above there can be prepared other allylhydantoins substituted in the 1-, 3- and 5-positions by alkyl groups containing between one and four carbon atoms in the alkyl chain and by monocyclic-aryl-lower-alkyl groups which can be substituted in the aryl nucleus by up to three substituents. Exemplary of such allylhydantoins are 1-allyl-3-benzylhydantoin, 1-allyl-3-butylhydantoin, 1-allyl-3,5,5-trimethylhydantoin, 1-allyl-3-(4-chlorobenzyl)-5,5-dimethylhydantoin, 3-allyl-1-propylhydantoin, 3-allyl-1-phenyl-5,5-dimethylhydantoin, 3-allyl-5-ethylhydantoin, 3-allyl-5-(4-chlorophenyl)-hydantoin, 5-allyl-1,3-dimethylhydantoin, 5-allyl-3,5-diethlyhydantoin, 5-allyl-3-benzyl-1-methylhydantoin, and 5-allyl-1-methylhydantoin.

Example 1

1-(*3-chloromercuri-2-methoxypropyl*)*hydantoin* [Formula IV*a*; $R_1=R_2=R_3=H$; $Y=CH_3$; Anion=Cl].—A solution containing 4.2 g. (0.3 mole) of 1-allylhydantoin in 100 ml. of methanol was mixed with 9.6 g. (0.03 mole) of mercuric acetate in 50 ml. of hot methanol, and the resulting solution was treated with two drops of concentrated nitric acid. On standing at 25°, solid 1-(3-acetoxymercuri-2-methoxypropyl)hydantoin precipitated. An additional 50 ml. of methanol was added to dissolve the precipitate. The addition of a solution containing 3 g. of sodium chloride in 10 ml. of water to the methanolic solution caused the precipitation of the 1-(3-chloromercuri-2-methoxypropyl)hydantoin which was collected and recrystallized once from water. The product thus obtained weighed 11.8 g. (96 percent of theory) and melted at 154.4–157.6° C. (corr.) with decomposition.

*Analysis.*—Calcd. for $C_7H_{11}ClHgN_2O_3$: C, 20.64; H, 2.72; N, 6.88; Hg, 49.26. Found: C, 20.99; H, 2.59; N, 6.82; Hg, 49.50.

Example 2

5-(*3-chloromercuri-2-methoxypropyl*)*hydantoin* [Formula IV*c*; $R_1=R_2=R_3=H$; $Y=CH_3$; Anion=Cl].—Following the procedure outlined in Example 1 above, there was obtained from 4.2 g. (0.03 mole) of 5-allyhydantoin, and 9.6 g. (0.03 mole) of mercuric acetate in 300 ml. of methanol a white, chalky precipitate consisting of 5-(1-acetoxymercuri-2-methoxypropyl)hydantoin. The precipitate was dissolved in dilute acetic acid and treated with 3.5 g. (0.06 mole) of sodium chloride in 50 ml. of water. On cooling, the solution deposited 9.8 g. of white needles which, after one recrystallization from 100 ml. of 1:1 dimethylformamide and water yielded 8.7 g. of 5-(3-chloromercuri-2-methoxypropyl)hydantoin, M.P. 165.2–166.2° C. (corr.) (dec.).

*Analysis.*—Calcd. for $C_7H_{11}ClHgN_2O_3$: C, 20.64; H, 2.72; N, 6.88; Hg, 49.26. Found: C, 20.57; H, 2.71; N, 6.90; Hg, 48.3.

Example 3

3-(*3-chloromercuri-2-methoxypropyl*)*hydantoin* [Formula IV*b*; $R_1=R_2=R_3=H$; $Y=CH_3$; Anion=Cl].—Following the procedure given in Example 1 above, there was prepared from 5.6 g. (0.04 mole) of 3-allylhydantoin and 12.8 g. (0.04 mole) of mercuric acetate in 200 ml. of methanol a solution of 3-(1-acetoxymercuri-2-methylpropyl)hydantoin. A test for mercuric ion using 2 N sodium hydroxide solution indicated that methoxymercuration was complete in a few minutes. A solution containing 4.6 g. (0.08 mole) of sodium chloride was added, and the resulting solution was concentrated to one-half its volume by warming on a steam bath. On cooling, 3-(3-chloromercuri-2-methoxypropyl)hydantoin separated, and after recrystallization from water, the white prismatic crystals melted at 144.2–146.0° C. (corr.).

*Analysis.*—Calcd. for $C_7H_{11}ClHgN_2O_3$: C, 20.64; H, 2.72; Hg, 49.26. Found: C, 20.48; H, 3.42; Hg, 49.00.

Example 4

3-(*3 - chloromercuri-2-methoxypropyl*) - *5,5-dimethylhydantoin* [Formula IV*b*; $R_1=H$; $R_2=R_3=Y=CH_3$; Anion=Cl].—Following the procedure given in Example 1 there was obtained from 0.03 mole of each 3-allyl-5,5-dimethylhydantoin and mercuric acetate in 100 ml. of methanol a solution of 3-(3-acetoxymercuri-2-methoxypropyl)-5,5-dimethylhydantoin. Following treatment with sodium chloride solution an oil was obtained which was crystallized from ethyl acetate. The product, 3-(3-chloromercuri-2-methoxypropyl) - 5,5-dimethylhydantoin, was collected as white microprisms, M.P. 114.0–116.2° C. (corr.).

*Analysis.*—Calcd. for $C_9H_{15}ClHgN_2O_3$: N, 6.44; Hg. 46.08. Found, N, 6.42; Hg. 45.50.

Example 5

5-(*3-chloromercuri-2 - methoxypropyl*)- *3 - methylhydantoin* [Formula IV*c*; $Y=R_2=CH_3$; $R_1=R_3=H$; Anion =Cl].—Following the procedure shown in Example 1, 3.5 g. (0.023 mole) of 5-allyl-3-methylhydantoin was mercurated with 4.6 g. (0.023 mole) of mercuric acetate in 150 ml. of methanol. The clear solution of 5-(3-acetoxymercuri-2-methoxypropyl)-3-methylhydantoin which resulted was treated with a solution of 5.8 g. (0.1 mole) of sodium chloride in 25 ml. of water, and 5-(3-chloromercuri-2-methoxypropyl) - 3 - methylhydantoin crystallized as white needles. After recrystallization from aqueous methanol the product melted at 142.4–153.6° C. (corr.).

*Analysis.*—Calcd. for $C_8H_{13}ClHgN_2O_3$: C, 22.81; H, 3.11; Hg, 47.62; N, 6.65. Found: C, 22.60; H, 3.18; Hg, 46.40; N, 6.48.

Example 6

1-(*3-chloromercuri-2-methoxypropyl-3 - methylhydantoin* [Formula IV*a*; $Y=R_1=CH_3$; $R_2=R_3=H$; Anion=Cl].—By the procedure of Example 1, from 4.6 g. (0.023 mole) of mercuric acetate, 3.5 g. (0.023 mole) of 1-allyl-3-methylhydantoin, and 50 ml. of methanol, there was obtained 1-(3-acetoxymercuri-2-methoxypropyl)-3-methylhydantoin. Addition of 3.0 g. (0.05 mole) of sodium chloride in 10 ml. of water to the methanolic solution and removal of the solvent produced a colorless oil consisting of the corresponding chloro-compound. Chromatographing the oil dissolved in methylene dichloride on a column of silica gel and eluting with 1:4 acetone-ether gave 1-(3-chloromercuri-2-methoxypropyl)-3-methylhydantoin as white platelets melting at 146.8–149° C. (corr.).

*Analysis.*—Calcd. for $C_8H_{13}ClHgN_2O_3$: C, 22.81; H, 3.11; Hg, 47.62. Found: C, 23.15; H, 3.01; Hg, 46.90.

Example 7

3-(*3-chloromercuri-2-methoxypropyl*) - 1-*methylhydantoin* [Formula IV*b*; $Y=R_1=CH_3$; $R_2=R_3=H$; Anion=Cl].—Using the procedure outlined in Example 1, 3-(3-acetoxymercuri-2-methoxypropyl) - 1 - methylhydantoin was obtained from 7.7 g. (0.05 mole) of 3-allyl-2-methylhydantoin, 10.0 g. (0.05 mole) of mercuric acetate, and 75 ml. of methanol. Addition of 5.8 g. (0.1 mole) of sodium chloride in 25 ml. of water to the methanolic solution and removal of the solvent produced a colorless oil. Chromatographing the oil twice on silica gel, eluting with 1:99 acetone-ether, and recrystallizing from absolute alcohol gave 3-(3-chloromercuri-2- methoxypropyl) - 1 - methylhydantoin as white needles, M.P. 85.8–86.8° C. (corr.).

*Analysis.*—Calcd. for $C_8H_{13}ClHgN_2O_3$; Cl, 22.81; H, 3.11; Hg, 47.62; N, 6.65. Found: C, 22.88; H, 2.86; Hg, 47.70; N, 6.55.

The procedures given in the above examples can be used to prepare many mercuripropylhydantoins of Formulas IIIa, IIIb, and IIIc. The table below shows further examples encompassed in the concept of the invention. These examples serve to illustrate the scope of the invention, and are not intended to limit it thereto. The group Y is determined by the mercuration-reaction solvent. The anion can be chosen at will under favorable solubility product conditions by a metathetical reaction of the acetoxymercuri compound, or it may be chosen by reaction of the hydroxymercuri compound with the appropriate acid, HAnion.

| Example No. | Allylhydantoin Used | Final Product |
|---|---|---|
| 8 | 1-allyl-3-benzylhydantoin | 3-benzyl-1-(3-bromomercuri-2-ethoxypropyl)-hydantoin. |
| 9 | 1-allyl-3-butylhydantoin | 3-butyl-1-(3-hydroxymercuri-2-hydroxypropyl) hydantoin. |
| 10 | 1-allyl-3,5,5-trimethyl-hydantoin. | 1-(3-methylsulfonatomercuri-2-methoxyethoxypropyl)-3,5,5-trimethylhydantoin. |
| 11 | 1-allyl-3-(4-chlorobenzyl)-5,5-dimethylhydantoin. | 3-(4-chlorobenzyl)-5,5-dimethyl-1-(3-propionoxymercuri-2-hydroxyethoxypropyl)-hydantoin. |
| 12 | 3-allyl-1-propylhydantoin | 3-(3-carboxymethyl-mercaptomercuri-2-ethoxyethoxypropyl)-1-propylhydantoin. |
| 13 | 3-allyl-1-phenyl-5,5-dimethylhydantoin. | 5,5-dimethyl-3-(3-phenoxymercuri-2-butoxypropyl)-1-phenylhydantoin. |
| 14 | 3-allyl-5-ethylhydantoin | 5-ethyl-3-(3-theophyllinylmercuri-2-(2,3-dihydroxypropoxypropyl)hydantoin. |
| 15 | 3-allyl-5-(4-chlorophenyl)-hydantoin. | 5-(4-chlorophenyl)-3-(3-nitratomercuri-2-(2-chloroethoxy)propylhydantoin. |
| 16 | 3-allyl-1-(2-pyridyl)-hydantoin. | 3-(3-p-toluenesulfonatomercuri-2-(2-propyloxy)propyl-1-(2-pyridyl)-hydantoin. |
| 17 | 1-allyl-3-(2-[5-nitrofuryl])-hydantoin. | 1-(3-succinimidomercuri-2-methoxypropyl)-3-(2-[5-nitrofuryl])hydantoin. |

I claim:
1. A compound having the formula

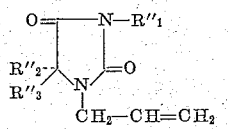

wherein $R''_1$, $R''_2$, and $R''_3$ are selected from the group consisting of H and lower-alkyl of from one to four carbon atoms.

2. 1-allylhydantoin.
3. 1-allyl-3-methylhydantoin.

References Cited by the Examiner

UNITED STATES PATENTS

| 2,366,221 | 1/45 | Spurlock | 260—309.5 |
| 2,466,177 | 4/49 | Long | 260—309.5 |
| 2,556,791 | 6/51 | Billman et al. | 260—534 |
| 2,572,568 | 10/51 | Gluesenkamp | 260—534 |
| 2,605,285 | 7/52 | Schultz | 260—534 |
| 2,687,416 | 8/54 | Persch et al. | 260—309.5 |

FOREIGN PATENTS 846,601  8/60  Great Britain.

OTHER REFERENCES

Bailey et al.: Berichte, vol. 41, p. 2499 (1908).

Burger Medicinal Chemistry, 2nd ed., pp. 652–4, New York, Interscience, 1960.

Conant: The Chemistry of Organic Compounds, 3rd ed., p. 342, New York, MacMillan, 1947.

Gaudry et al.: Canadian Jour. Chem., vol. 34, p. 513 (1956).

Gubitz et al.: Jour. Med. Pharm. Chem., vol. 5, pp. 168–75 (January 1962).

Haas: Chemical Abstracts, vol. 43, p. 6308 (1949) (abstract of, article from Arch. Exptl. Path Pharmakol., vol. 204, pp. 166–85 (1947)).

Oba et al.: Chemical Abstracts, vol. 46, p. 3805f (1952) (abstract of article from Jour. Soc. Sci. Phot. (Japan), vol. 13, No. 3, pp. 33–8 (1951)).

WALTER A. MODANCE, *Primary Examiner.*

IRVING MARCUS, NICHOLAS S. RIZZO, *Examiners.*